C. E. ADAIR.
THERMOSTATIC CONTROLLER FOR FLUID HEATING SYSTEMS.
APPLICATION FILED JAN. 11, 1909.

982,229.

Patented Jan. 24, 1911.

WITNESSES:
Clarence W. Carroll
D. Gurnee.

INVENTOR:
Charles E. Adair
by Offield & Davis
his Attys

UNITED STATES PATENT OFFICE.

CHARLES E. ADAIR, OF BUFFALO, NEW YORK, ASSIGNOR TO CYPHERS INCUBATOR COMPANY, OF BUFFALO, NEW YORK, A CORPORATION OF NEW YORK.

THERMOSTATIC CONTROLLER FOR FLUID-HEATING SYSTEMS.

982,229.          Specification of Letters Patent.      Patented Jan. 24, 1911.

Application filed January 11, 1909. Serial No. 471,771.

*To all whom it may concern:*

Be it known that I, CHARLES E. ADAIR, a citizen of the United States, and resident of Buffalo, in the county of Erie and State of New York, have invented certain new and useful Improvements in Thermostatic Controllers for Fluid-Heating Systems, of which the following is a specification.

This invention relates to thermostatic controllers for fluid heating systems, and consists in the apparatus hereinafter described and claimed.

The object of the invention is to produce a device of the kind referred to which shall be readily adjustable and which shall have provision for both making and observing such adjustment from without the casing of the device.

Figure 1:
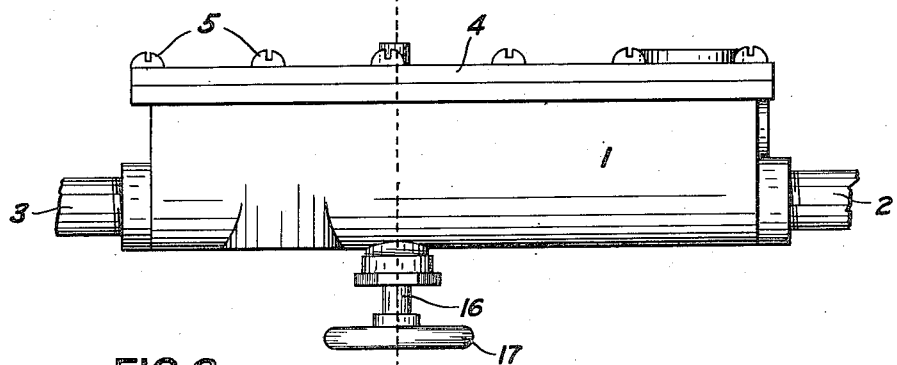
Figure 2:
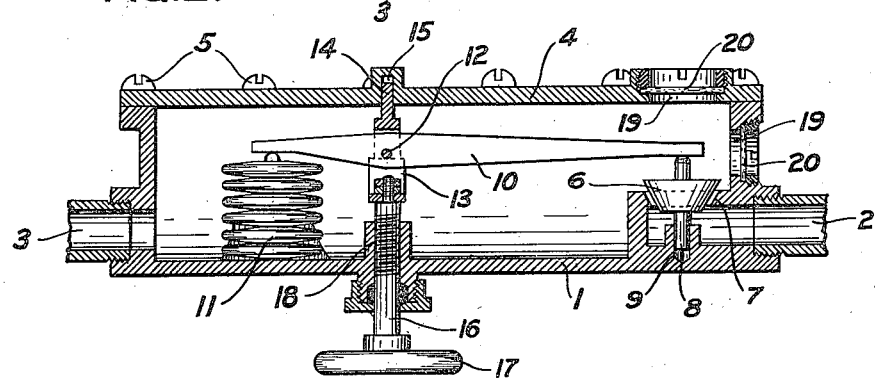
Figure 3:
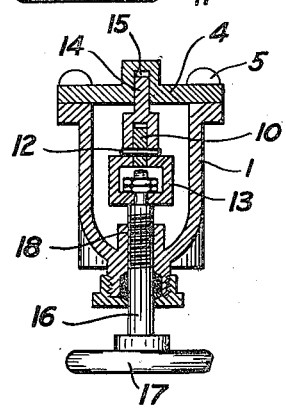

In the drawings:—Figure 1 is a side elevation of a device embodying this invention; Fig. 2 is a vertical central section through the same, and Fig. 3 is a vertical section on the line 3—3 of Fig. 1.

In the drawings, the casing 1 is of any suitable form, having an inlet connection 2 and an outlet connection 3 for circulating fluid, such as water, which is employed to heat spaces, such as incubator and brooder chambers, and to maintain the heat therein at a predetermined temperature. The casing 1 is fluid-tight, and is provided with a cover 4 held tight on the casing proper by means of screws 5. Within the casing, and at the inlet end thereof, is a valve 6 adapted to control the inlet passage. This valve may be of any suitable construction, and, in the present embodiment of the invention, is shown as a conical valve body fitting on a conical seat 7, the valve body having a guide pin 8, one end of which runs in a guide socket 9 in the casing. The other end of the guide pin engages a lever 10. This lever has a pivotal support within the casing constituting the fulcrum of the lever, and the other end of the lever is connected to a thermostatic device 11 that expands and contracts under the influence of heat. In the present example of the invention this thermostatic device is a fluid-tight box, corrugated for greater expansibility, and containing a suitable volatile fluid. This thermostatic element is well known in various mechanisms. On expansion or contraction of the thermostatic element 11, the lever will rock on its fulcrum and will close or open the valve 6, so that when the temperature rises beyond a selected point, the valve will close and will open again when the temperature has fallen below that point.

It is important in apparatus of this kind to permit the operator to determine the position taken by the inlet valve at different degrees of temperature of the circulating fluid. At times it is important to change volume of flow, and for this purpose some means must be arranged for changing the stroke of the valve, and also for determining from the outside of the casing what is the position of the valve in all its movements.

The lever 10 is pivoted on a pin 12 in a frame 13, which is guided in any suitable way in the casing, such as by means of a pin 14 passing into a socket 15 in said casing. The pin 14 and socket 15 may be squared, or otherwise shaped, to prevent the turning of the pin in the casing. Through the opposite side of the casing passes a screw-threaded stem 16 (operated by a hand-wheel 17) running in a correspondingly threaded portion 18 of the casing. A swivel connection is provided between the stem and the frame, so that the stem may turn independently of the frame.

On turning the hand-wheel the fulcrum pin 12 and the lever 10 are raised or lowered, and thus the position of the valve 6 may be adjusted with reference to its seat, so that the valve will open and close at selected temperatures. In order to permit direct observation of the position of the valve, two sight-holes 19, each properly closed fluid-tight by a plate of glass 20, are made in the two walls of the casing, adjacent to the valve 6, one of these holes serving to illuminate the valve, while through the other the position of the valve may be seen. Thus an accurate adjustment of the valve may be effected with certainty and with the least loss of time.

What I claim is:—

1. In a thermostatic controller for fluid heating systems, the combination of a casing through which the heating fluid flows having an inlet and an outlet, a thermostatic element therein, a valve for closing the inlet, a lever within the casing connecting the valve and the thermostatic element, a frame within the casing provided with a fulcrum on which the lever is pivoted, and means connected with the frame and passing through a fluid-tight opening in the casing, so as to be accessible from without the casing, to shift the fulcrum of the lever and adjust the valve.

2. In a thermostatic controller for fluid heating systems, the combination of a casing through which the heating fluid flows having an inlet and an outlet, a thermostatic element therein, a valve for closing the inlet, lever mechanism connecting the valve and the thermostatic element, and means accessible from without the casing for shifting the fulcrum of the lever to adjust the valve, the casing having a fluid-tight sight-hole adjacent to the valve to afford a view of the valve from outside the casing.

3. In a thermostatic controller for fluid heating systems, the combination of a casing through which the heating fluid flows having an inlet and an outlet, a thermostatic element therein, a valve for closing the inlet, lever mechanism connecting the valve and the thermostatic element, and means accessible from the exterior of the casing for adjusting the valve, the casing having two fluid-tight sight-holes in two sides of the casing adjacent to the valve for illuminating the valve and rendering it visible from outside the casing.

CHARLES E. ADAIR.

Witnesses:
A. W. PLUMLEY,
R. M. PRICE.